Patented July 22, 1952

2,604,172

UNITED STATES PATENT OFFICE 2,604,172

METHOD FOR CONSOLIDATING AND PLUGGING FORMATIONS

Gilbert G. Wrightsman, Houston, Tex., assignor, by mesne assignments, to Standard Oil Development Company, Elizabeth, N. J., a corporation of Delaware No Drawing. Application April 15, 1946,
Serial No. 662,408

4 Claims. (Cl. 166—22)

The present invention is directed to a method for consolidating and solidifying formations, such as sand, and more particularly to a method for consolidating and solidifying formations penetrated by a borehole.

It is often desirable to consolidate loose or incompetent formations without rendering them impermeable. As a specific example, petroleum producing formations penetrated by a borehole are often of such a nature that, when fluid flows into the open hole, it carries with it substantial amounts of the grains or particles comprising the formation and it is desirable to consolidate these formations without rendering them impermeable. Oftentimes, also, water producing formations are penetrated and it is desired that these formations be plugged or sealed to prevent the entry of water into the borehole. While means are at present known for shutting off water from a borehole and for solidifying water-wet, unconsolidated formations, the present known methods are by no means entirely satisfactory.

It is one object of the present invention to provide an improved method for consolidating incompetent, water-wet formations without rendering them impermeable. It is another object of the present invention to provide an improved method for sealing fluid-producing, water-wet formations. Still another object of the present invention is to provide an improved agent adapted for sealing or for consolidating producing formations.

The present invention is based upon the discovery that stannous chloride, or a mixture of stannous chloride with a mineral acid, has unexpectedly useful properties in the treatment of subsurface formations. Not only does stannous chloride catalyze the formation of a resin adapted to solidify these formations, but also it causes water-wet siliceous formations to be preferentially wetted by oils and particularly by the resinous material.

In accordance with the present invention, a liquid mixture capable of reacting in the presence of a catalyst to form a resin is introduced into a water-wet formation and maintained in position until it is converted into a solid resin. In order to obtain satisfactory physical contact between the particles of the water-wet formation and the resin-forming liquid, an agent capable of catalyzing formation of the resin and simultaneously capable of rendering the particles of the formation wet by the resin-forming liquid is used in conjunction with the resin-forming liquid. The agent capable of rendering the particles of the formation wettable by the resin-forming liquid may precede that liquid into the formation or it may accompany the resin-forming liquid into the formation. Alternatively, a portion of the agent may precede the resin-forming liquid, while another portion is admixed with the resin-forming liquid to form a homogeneous mixture which is forced into the formation.

The resin-forming material employed in the practice of the present invention is preferably introduced into the formation in the form of a mobile, homogeneous liquid which is capable of being readily pumped into the borehole and of being forced into the formation, and is also capable of forming a resin at the temperature encountered in the well. The homogeneous resin-forming material employed in one modification of my invention and particularly suitable for plugging a formation may be described as an oily liquid resin in an early stage of synthesis which has the property of undergoing further synthesis at temperatures encountered in the formation so that after it has been placed in the formation it condenses to form a solid resin. The homogeneous, mobile liquids employed as plugging agents in the present invention are oily and substantially immiscible with water. Homogeneous liquids which condense to form solid products which are insoluble in either oil or water, and which are suitable for use in the practice of this modification of the present invention are known to the art. For example, mixtures capable of reacting in underground formations to form phenol-formaldehyde resins are known to the art.

The following is given as a specific example illustrating the formation of such a homogeneous resin-forming liquid suitable for use in plugging a water-wet formation. Aqueous solutions of a phenol and formaldehyde are admixed in the presence of an acid reacting catalyst at room temperature and are allowed to react. An intermediate reaction product separates as an oily phase from an aqueous phase and the oily product is separated from the aqueous phase after settling and is employed as the plugging agent of the present invention. The oily, liquid resin phase includes the necessary amount of catalyst and other ingredients to permit its further reaction under the temperature conditions usually encountered in boreholes and results in a solid condensation product.

The method of the present invention may be practised in conjunction with methods previously disclosed in the art for consolidating incompetent formations to render them competent without rendering them impermeable. Thus, the catalyst-wetting agent of the present invention may be employed in conjunction with methods disclosed in U. S. Patent 2,378,817. Preferably, incompetent formation may be rendered competent and permeable by employing the catalyst-wetting agent of the present invention in conjunction with the method disclosed in my co-pending application Serial No. 662,407, filed of even date herewith and now abandoned. Briefly, in accordance with one method disclosed in the aforementioned co-pending application, a homogeneous mixture of a low molecular weight hydroxy aryl compound is admixed with a molecular excess of an aldehyde over that capable of reacting with the hydroxy aryl compound and a catalyst, and the mixture is pumped into a borehole and forced into the incompetent formation. The homogeneous mixture is retained in the formation until substantially all of the hydroxy aryl compound has reacted with the aldehyde to form a solid resin. The unreacted portion of the excess aldehyde solution in the mixture is then withdrawn by production of fluids from the formation to leave a firm, permeable structure.

It is well known to the art that in wetted subsurface formations, the particles of the formation are usually coated with a film of water. If the formation is a water producing formation, water is the only fluid which flows therethrough even though small quantities of oil may be present therein, but since sand grains are water-wettable, the particles of the formation must necessarily be coated with a film of water. In typical oil producing formations or oil sands, the particles of the sand usually are also covered by films of water although the interstices between the grains of sand are occupied by petroleum.

In accordance with the present invention, the homogeneous resin-forming liquid is employed in conjunction with a novel catalytic agent which is capable not only of catalyzing reaction between a hydroxy aryl compound and an aldehyde but also of rendering the particles of the water-wet formation preferentially wettable by the resin-forming liquid. The utilization of such an agent insures satisfactory consolidation of the formation by removing the water film from the water-wet part of the formation and allowing the resin-forming liquid to come into direct physical contact with the surfaces of the particles.

In the practice of the present invention, a low concentration of stannous chloride or of stannous chloride admixed with a mineral acid is employed as the catalyst for reaction of the resin-forming liquid. However, experience has shown that these preferred catalysts may react with certain mineral components in the formations to be treated and reaction with these mineral components tends to neutralize the catalytic effect. Accordingly, it is often desirable in the practice of the invention to pretreat the formation with a fluid treating agent consisting essentially of an inorganic, acid-reacting composition chosen from the class consisting of a dilute mineral acid, or a small quantity of the stannous chloride catalyst, or a mixture of the stannous chloride and mineral acid prior to treatment of the formation with the aldehyde-phenol-catalyst mixture. This may be done by placing a small quantity of the acid or catalyst in the borehole and forcing this agent into the formation by well-known means. When accurate control of the amount of catalyst to be employed during the consolidation of or plugging of the formation is desired, the pretreating agent may be followed by treatment with water to wash the pretreating agent from the portion of the formation which is to be consolidated or plugged. Alternatively, the small quantity of acidic and/or catalytic material which adheres to the particles in the formation may be left therein and the aldehyde-phenol mixture, with equal or less than a normal amount of catalyst, may be introduced and allowed to react in the formation. In this way the excess catalytic material adhering to the particles in the formation assists in catalyzing the reaction between the aldehyde and the phenol.

The method of the present invention will be better understood by those skilled in the art from a study of the following examples:

Example 1

A reaction mixture was prepared by dissolving 2 grams of stannous chloride in 50 grams of formalin and admixing therewith 50 grams of cresol. The mixture was allowed to react at 115° F. which caused the separation of an oily liquid resin after 1 hour and 15 minutes. The oily resin phase amounted to approximately 50% of the total reaction volume and adhered strongly to the glass reaction vessel. When the resinous material became hard after 18 hours additional heating at 115° F. and was allowed to cool, the reaction vessel broke due to the large coefficient of expansion of the resin relative to the glass and to the firm bond of the material to the glass.

Example 2

A reaction mixture was prepared by dissolving 2 grams of stannous chloride in 50 grams of formalin and mixing therewith 50 grams of cresol. This mixture was then added to clean graded 100–200 mesh sand which had been moistened first with water and then with oil prior to the introduction of the reaction mixture. After 24 hours heating at 115° F. the sand was firmly bounded together and retained about 25% of its original permeability.

It will be seen from the above examples that a phenol-formaldehyde resin which has been formed in the presence of stannous chloride readily forms a strongly adhesive film on siliceous material even though that siliceous material has previously been wet with water.

Although by virtue of its low cost and ready commercial availability, formaldehyde or formalin will generally be employed as the aldehyde in the practice of the present invention other water soluble aldehydes may be used in the place thereof. Likewise, a large number of different hydroxy aryl compounds, such as phenol, cresol, resorcinol, alpha naphthol, salicylic acid and similar low molecular weight phenolic materials having less than 3 carbon atoms in alkyl side chains, or mixtures thereof may be employed as the particular phenol.

While it is imperative in the practice of the present invention in order to achieve full advantages thereof that the reaction mixture should include a small percentage of stannous chloride, advantageous results may be obtained when the catalyst is diluted with an acid, such as hydrochloric acid, sulfuric acid, phosphoric acid or esters thereof. While highly ionizable mineral acids or their esters are preferred, low molecular weight organic acids may be employed, but their action will be relatively slow.

The ratio of formalin to hydroxy aryl compounds used in a given case will depend on the permeability and porosity of the formation to be treated as well as upon the amount of consolidation or plugging which is desired. In general, the range of formaldehyde to hydroxy aryl compound ratios will vary from about 1:1 to about 9:1 parts by weight corresponding to mole ratios of about 1.4:1 to about 13:1. The concentration of the catalyst may be varied from about 0.25% to about 10% by weight of the total reaction mixture, the concentration being dependent upon the temperature conditions and the reaction time desired in the formation. When the catalytic agent is composed of an acid and stannous chloride, the ratio of the latter to the former may be varied from about 1:1 to about 100:1 parts by weight.

While I have given specific examples relating to the practice of the present invention, it will be understood that the examples are given by way of illustration and not by limitation. The invention is particularly suitable for sealing off water producing formations and for consolidating incompetent sands penetrated by a borehole but it will be understood that it is broadly applicable to treating formations naturally wetted by water which prevents physical contact between the homogeneous resin-forming liquid and the particles of the formation.

While the wetting properties of the preferred catalyst of this invention are advantageously utilized in conjunction with a homogeneous aqueous mixture of an aldehyde and an hydroxy aryl compound, it will be understood that the wetting properties of the catalyst are retained when the catalyst is employed with mixtures of aldehyde and phenol which are separated as an oily phase from an aqueous phase before the former phase is introduced into the formation to be treated.

Having fully described the present invention, what I desire to claim is:

1. A method for treating a water-wet siliceous formation which comprises the steps of introducing into said formation a fluid treating agent consisting essentially of an inorganic, acid-reacting composition chosen from the class consisting of a dilute mineral acid, stannous chloride, and a mixture of a dilute mineral acid and stannous chloride, said treating agent being capable of reacting with a part of the solid natural components of said formation, retaining said treating agent in the formation for a predetermined period of time, subsequently introducing into said formation a homogeneous fluid mixture comprising a water-soluble aldehyde, a low molecular weight phenol having less than 3 carbon atoms in alkyl side chains, and a catalytic agent comprising stannous chloride capable of catalyzing reaction between said aldehyde and said phenol to form a resinous reaction product and simultaneously capable of causing said water-wet formation to be preferentially wetted by said resinous reaction product, and retaining said homogeneous fluid mixture in the formation at least until said resinous reaction product has formed.

2. A method in accordance with claim 1 in which both said treating agent and said catalytic agent are stannous chloride.

3. A method in accordance with claim 1 in which said treating agent is a mixture of stannous chloride and a dilute mineral acid.

4. A method in accordance with claim 1 in which said treating agent consists of a mineral acid and said catalytic agent is a mixture of stannous chloride and a mineral acid, the weight ratio of said stannous chloride to said mineral acid being in the range of about 1:1 to about 100:1.

GILBERT G. WRIGHTSMAN.

REFERENCES CITED

The following references are of record in the file of this patent:

UNITED STATES PATENTS

| Number | Name | Date |
| --- | --- | --- |
| 1,549,888 | Miles | Aug. 18, 1925 |
| 2,248,028 | Prutton | July 1, 1941 |
| 2,307,843 | Mathis et al. | Jan. 12, 1943 |
| 2,338,799 | Buckley et al. | Jan. 11, 1944 |
| 2,345,611 | Lerch et al. | Apr. 4, 1944 |
| 2,378,817 | Wrightsman et al. | June 19, 1945 |
| 2,476,015 | Wrightsman | July 12, 1949 |

FOREIGN PATENTS

| Number | Country | Date |
| --- | --- | --- |
| 375,638 | Germany | May 16, 1923 |